(12) United States Patent
Barton et al.

(10) Patent No.: US 8,621,227 B2
(45) Date of Patent: Dec. 31, 2013

(54) SYSTEM AND METHOD FOR CRYPTOGRAPHIC KEY EXCHANGE USING MATRICES

(75) Inventors: Edward M. Barton, Dublin, CA (US); Len L. Mizrah, San Carlos, CA (US)

(73) Assignee: Authernative, Inc., Redwood City, CA (US)

( * ) Notice: Subject to any disclaimer, the term of this patent is extended or adjusted under 35 U.S.C. 154(b) by 194 days.

(21) Appl. No.: 12/980,218

(22) Filed: Dec. 28, 2010

(65) Prior Publication Data

US 2012/0166809 A1   Jun. 28, 2012

(51) Int. Cl.
*H04L 9/32* (2006.01)
*H04K 1/00* (2006.01)
*H04L 9/00* (2006.01)

(52) U.S. Cl.
USPC ............. 713/181; 380/28; 380/44; 380/277

(58) Field of Classification Search
USPC .............................. 713/181; 380/28, 44, 277
See application file for complete search history.

(56) References Cited

U.S. PATENT DOCUMENTS

| | | | |
|---|---|---|---|
| 4,200,770 A | 4/1980 | Hellman et al. | |
| 4,218,582 A | 8/1980 | Hellman et al. | |
| 4,405,829 A | 9/1983 | Rivest et al. | |
| 5,241,599 A | 8/1993 | Bellovin et al. | |
| 5,295,188 A * | 3/1994 | Wilson et al. | 380/30 |
| 5,299,263 A | 3/1994 | Beller et al. | |
| 5,440,635 A | 8/1995 | Bellovin et al. | |
| 5,841,871 A | 11/1998 | Pinkas | |
| 5,966,444 A * | 10/1999 | Yuan et al. | 380/283 |
| 6,766,453 B1 | 7/2004 | Nessett et al. | |
| 6,996,724 B2 * | 2/2006 | Murakami et al. | 713/193 |
| 7,010,692 B2 | 3/2006 | Jablon | |
| 7,024,690 B1 * | 4/2006 | Young et al. | 726/5 |
| 7,113,594 B2 | 9/2006 | Boneh et al. | |
| 7,136,484 B1 | 11/2006 | Koh | |
| 7,139,917 B2 | 11/2006 | Jablon | |
| 7,184,551 B2 * | 2/2007 | Slavin | 380/44 |
| 7,299,356 B2 | 11/2007 | Mizrah | |
| 7,346,162 B2 * | 3/2008 | Slavin | 380/30 |
| 7,350,076 B1 | 3/2008 | Young et al. | |
| 7,506,161 B2 | 3/2009 | Mizrah | |
| 7,581,100 B2 | 8/2009 | Mizrah | |

(Continued)

OTHER PUBLICATIONS

International Search Report and Written Opinion mailed Apr. 10, 2012 in PCT/US11/66532, 7pp.

(Continued)

*Primary Examiner* — Saleh Najjar
*Assistant Examiner* — Oleg Korsak
(74) *Attorney, Agent, or Firm* — Haynes Beffel & Wolfeld LLP (57) ABSTRACT

Two parties can establish a cryptographic key using a matrix based key exchange protocol, for secure communications without any prior distribution of secret keys or other secret data, and without revealing said key to any third party who may have access to all of the transmissions between them. A common matrix M, shared in advance, is multiplied by a random matrix K on the sending side, and a different random matrix N on the receiving side. The matrix product KM is sent from the sending side to the receiving side, and the matrix product MN is sent from the receiving side to the sending side. Both sides produce the common matrix product KMN, and use it for producing a symmetric key for encrypted communications.

54 Claims, 5 Drawing Sheets

(56) References Cited

U.S. PATENT DOCUMENTS

| | | | |
|---|---|---|---|
| 7,590,236 B1 | 9/2009 | Boneh et al. | |
| 7,634,087 B2 | 12/2009 | Boneh et al. | |
| 7,779,259 B2 | 8/2010 | Vanstone et al. | |
| 7,796,761 B2 | 9/2010 | Peyravian et al. | |
| 7,907,723 B2* | 3/2011 | Rubin | 380/28 |
| 7,912,213 B2* | 3/2011 | Rubin | 380/28 |
| 7,953,871 B2* | 5/2011 | Kuz et al. | 709/229 |
| 8,090,097 B2* | 1/2012 | Rubin | 380/28 |
| 8,098,815 B2* | 1/2012 | Rubin | 380/28 |
| 2001/0036275 A1 | 11/2001 | Murakami et al. | |
| 2004/0062390 A1* | 4/2004 | Slavin | 380/30 |
| 2004/0101135 A1* | 5/2004 | Kanamaru | 380/28 |
| 2004/0258240 A1* | 12/2004 | Singh | 380/30 |
| 2008/0037774 A1 | 2/2008 | Slavin | |
| 2008/0069346 A1 | 3/2008 | Rubin | |

OTHER PUBLICATIONS

"New Directions in Cryptography", Diffie et al., IEEE Transactions on Information Theory, vol. IT-22, No. 6, Nov. 1976.

Diffie & Hellman, Multi-User Cryptographic Techniques, AFIPS Conference Proceedings, vol. 45, pp. 109-112, Jun. 8, 1976.

David Jablon, "Extended Password Key Exchange Protocols Immune to Dictionary Attack", 1997, IEEE, pp. 248-255.

Bellovin et al, Augmented Encrypted Key Exchange: a password-Based protocol, 1993, ACM, pp. 244-250.

PKCS#3: Diffie-Hellman Key-Agreement Standard, an RSA Laboratories Technical Note, Version 1.4, Nov. 1, 1993.

Jablon, David P., Strong Password—Only Authenticated Key Exchange, Computer Communications Review, Oct. 1996. vol. 26, No. 5, ACM Press.

* cited by examiner

SYSTEM AND METHOD FOR CRYPTOGRAPHIC KEY EXCHANGE USING MATRICES

FIELD OF THE INVENTION

The invention relates to cryptographic systems in general. One aspect of the invention relates to a key distribution between two parties without prior distribution of secret keys. Another aspect of the invention relates to methods and systems for establishing authenticated and/or private communications between parties who initially share only a relatively insecure secret which, if used in a traditional hashing or similar password algorithm, can be easily brute forced.

PRIOR ART

It is believed that the idea of cryptography is as old writing itself. As soon as people could write, they wanted to make sure their messages could not be read by an unintended party. Early cryptographic efforts were simple substitution and transposition ciphers. These two techniques were broken by a technique called frequency analysis. From this point many cryptographic techniques have been created and broken.

A major breakthrough in the field of cryptography came from Diffie-Hellman-Merkle key exchange protocol disclosed in U.S. Pat. No. 4,200,770. This patent introduced the idea of a trap door, or one way, function that was exponentiation with the modulus function using large numbers. This 'power-mod' function is easy to calculate in one direction and difficult to calculate in the opposite direction. This invention allowed cryptographic keys to be created between two parties that do not have any previously shared information.

The Diffie-Hellman-Merkle method, and its mathematical properties, has been iterated and improved upon in many ways. One area is to use exponentiation with modulus as a way to encrypt and decrypt a message using different keys. A well known example of this is disclosed in U.S. Pat. No. 4,405,829 by Rivest et al. This so called public-key cryptography, also called asymmetric key cryptography, is still widely used today and is the core to many technologies like secure socket layer (SSL), transport layer security (TLS), pretty good privacy (PGP), and public key infrastructure (PKI).

Another area Diffie-Hellman-Merkle method has been improved upon is to have the two parties mutually authenticate each other. This solved a major problem with the Diffie-Hellman-Merkle key exchange protocol in that it was vulnerable to man-in-the-middle attacks. Major contributions in this space came in U.S. Pat. No. 5,241,599 by Bellovin et al., U.S. Pat. No. 5,440,635 by Bellovin et al., U.S. Pat. No. 7,010,692 by Jablon, U.S. Pat. No. 7,139,917 by Jablon, U.S. Pat. No. 5,299,267 by Bellare et al, U.S. Pat. No. 6,766,453 by Nessett et al., U.S. Pat. No. 7,024,690 by Nessett et al., and others whose patents are referenced below. These ideas are the core to many technologies like password authenticated key exchange (PAKE), password authenticated key (PAK), encrypted key exchange (EKE), simple password exponential key exchange (SPEKE), and secure remote password protocol (SRP).

All of these techniques, either with or without authenticating, are used to exchange a key which can then be used with a standard encryption algorithm like the data encryption standard (DES) or the advanced encryption standard (AES). They are all also using exponentiation in some form with large exponents. The problem with this is that taking numbers to large exponents is fairly slow computationally. This limitation lead to a shift where inventors looked to replace the exponentiation with modulus one way function with a different one way function that was easier to compute, and thus faster.

Matrix multiplication is a good candidate for a one way function. The multiplication itself is easy to do, and is much faster than exponentiation with large numbers. The reverse operation for multiplication is division, but matrix division is undefined. The way to solve a general matrix equation $A*x=B$ is to multiply by the inverse of A, denoted $A^{-1}$. The inverse of a matrix is defined as the matrix that, when multiplied with the original matrix, equals the identity matrix and can only be used for square matrices with non-zero determinants. The identity matrix is defined as a matrix that, when multiplied with another matrix, will not change the other matrix.

The non-existence of matrix division—and the need for there to be an inverse of a given matrix to solve a matrix equation, which either may not exist, or can be made to not be usable—makes matrix multiplication well suited as a one way function.

The prior art that has used matrix multiplication as a one way function include U.S. Pat. App. No. 2008/0069346 by Rubin and U.S. Pat. No. 7,346,162 by Slavin, listed in the references below. Both inventions use the commutative property for matrix multiplication in their art. Matrix multiplication is not typically commutative; for a given pair of random matrices A and B, $A*B!=B*A$ (where '!=' means does not equal). If a given pair of matrices must commute, as is needed in the prior art, there must be conditions placed on those matrices to ensure the commutative property that they rely on.

The prior art references are presented below:

| REFERENCES | | |
|---|---|---|
| 4,218,582 | August 1980 | Hellman et al. |
| 4,405,829 | September 1983 | Rivest et al. |
| 5,241,599 | August 1993 | Bellovin et al. |
| 5,299,263 | March 1994 | Beller et al. |
| 5,440,635 | August 1995 | Bellovin et al. |
| 5,841,871 | November 1998 | Pinkas |
| 6,766,453 | July 2005 | Nessett et al. |
| 7,024,690 | April 2006 | Nessett et al. |
| 7,010,692 | March 2006 | Jablon |
| 7,113,594 | September 2006 | Boneh et al. |
| 7,136,484 | November 2006 | Koh |
| 7,139,917 | November 2006 | Jablon |
| 7,184,551 | February 2007 | Slavin |
| 7,299,356 | November 2007 | Mizrah |
| 7,346,162 | March 2008 | Slavin |
| 7,350,076 | March 2008 | Nessett et al. |
| 7,506,161 | March 2009 | Mizrah |
| 7,581,100 | August 2009 | Mizrah |
| 7,590,236 | September 2009 | Boneh et al. |
| 7,634,087 | December 2009 | Boneh et al. |
| 7,779,259 | August 2010 | Vanstone et al. |
| 7,796,761 | September 2010 | Peyravian et al. |
| 2008/0069346 | March 2008 | Rubin |

OTHER REFERENCES

"New Directions in Cryptography", Diffie et al., IEEE Transactions on Information Theory, vol. IT-22, No. 6, November 1976.

Diffie & Hellman, Multi-User Cryptographic Techniques", AFIPS Conference Proceedings, vol. 45, pp. 109-112, Jun. 8, 1976.

David Jablon, "Extended Password Key Exchange Protocols Immune to Dictionary Attack", 1997, IEEE, pp. 248-255.

Bellovin et al, Augmented Encrypted Key Exchange: a password-Based protocol, 1993, ACM, pp. 244-250.

PKCS#3: Diffie-Hellman Key-Agreement Standard, A RSA Laboratories Technical Note, Version 1.4, Nov. 1, 1993.

Jablon, David P., Strong Password—Only Authenticated Key Exchange, Computer Communications Review, October, 1996. vol. 26, No. 5, ACM Press.

SUMMARY OF THE INVENTION

The present invention provides a system and method for establishing a secure communication channel without prior distribution of secret keys. It is further extended to provide a system and method for establishing mutually authenticated, secure communication with only a small, insecure shared secret known between them. The invention uses matrix multiplication as its one way function which provides a substantial performance enhancement over exponentiation with modulus using large numbers. It furthermore does not place any limitations on the randomness of the matrices used in generating key, because it does not require that any of the matrices commute.

Key Exchange Protocol

Two parties select a common key by:
(1) The two parties agree upon a common matrix M.
(2) The client randomly chooses a matrix K and the server randomly chooses a matrix N.
(3a) The client left multiplies M with K and sends the product KM to the server.
(3b) The server right multiplies M with N and sends the product MN to the client.
(4a) The client left multiplies MN by K to create the product K(MN).
(4b) The server right multiplies KM with N to create product (KM)N.

The products K(MN) and (KM)N are equal because of the associative property, which is true for all matrix multiplication. The product KMN can be used to produce a symmetric cryptographic key.

We take the method and system described above and replace the shared matrix M with a matrix M generated by a function seeded with the shared secret. M is no longer an openly shared value; it is generated independently on either side. Once the two parties have derived their KMN value, which will be equal if the shared secret on both sides was the same, they can use a standard algorithm for key validation, which will prove mutual authentication.

An example of a key validation technique is for the client to hash the key KEY, encrypt the hashed value with the key KEY, and send it to the server. The server decrypts the message with its key KEY, and check to see that the hashed value of its key KEY equals the value sent by the client. This provides client side authentication. Then the server hashes its key KEY twice, encrypts it with its key KEY, and sends it to the client. The client decrypts the message with its key KEY and checks to see if its key KEY hashed twice equals hashed value sent form the server. If it is the same, then the server is authenticated. At this point the client and server have authenticated to each other, thus establishing mutual authentication.

A similar key validation technique can be extended for the cases when more than one symmetric encryption keys are produced by using different parts of the KMN product matrix. For instance, using the KMN product to produce one, or more than one symmetric key can be done by simply separating the KMN matrix into small matrices. So, for example, if KMN is a 20×20 matrix, a key could be created from the first 10 rows, and a different key can be created from the last 10 rows. Then the elements in the respective matrices can be concatenated and hashed to produce the symmetric key.

Authenticated Key Exchange

Two parties select, and mutually authenticate, a common key by:
(1) The user enters their identifier and credential into the client and sends the user identifier to the server.
(2a) The client generates matrix M from a function seeded with the shared secret.
(2b) The server uses the user identifier to look up the shared secret from the credential store and creates matrix M from a function seeded with the shared secret.
(3) The client randomly chooses a matrix K and the server randomly chooses a matrix N.
(4a) The client left multiplies M with K and sends the product KM to the server.
(4b) The server right multiplies M with N and sends the product MN to the client.
(5a) The client left multiplies MN by K to create the product K(MN).
(5b) The server right multiplies KM with N to create product (KM)N.

If the matrix M on both sides was the same (the user entered credential was the same as the one in the credential store), then the KMN products will be the same on both sides. A standard algorithm for key validation can be used to validate the keys and, if the M matrix was the same on both sides, will succeed and the two parties will be mutually authenticated. If the user entered an incorrect credential, then the exchanged keys would be different, and the key validation would fail.

In alternative implementations, the matrix multiplication steps in both unauthenticated and authenticated key exchange protocols apply multiplication using a modulus function over a number p (mod p), where p is preferably a large prime integer.

DETAILED DESCRIPTION OF THE INVENTION

The first part of the invention herein disclosed is provide a means whereby two parties can establish a cryptographic key without permitting any eavesdropper to obtain or easily brute force those keys.

Key Exchange Protocol

Figure 1:
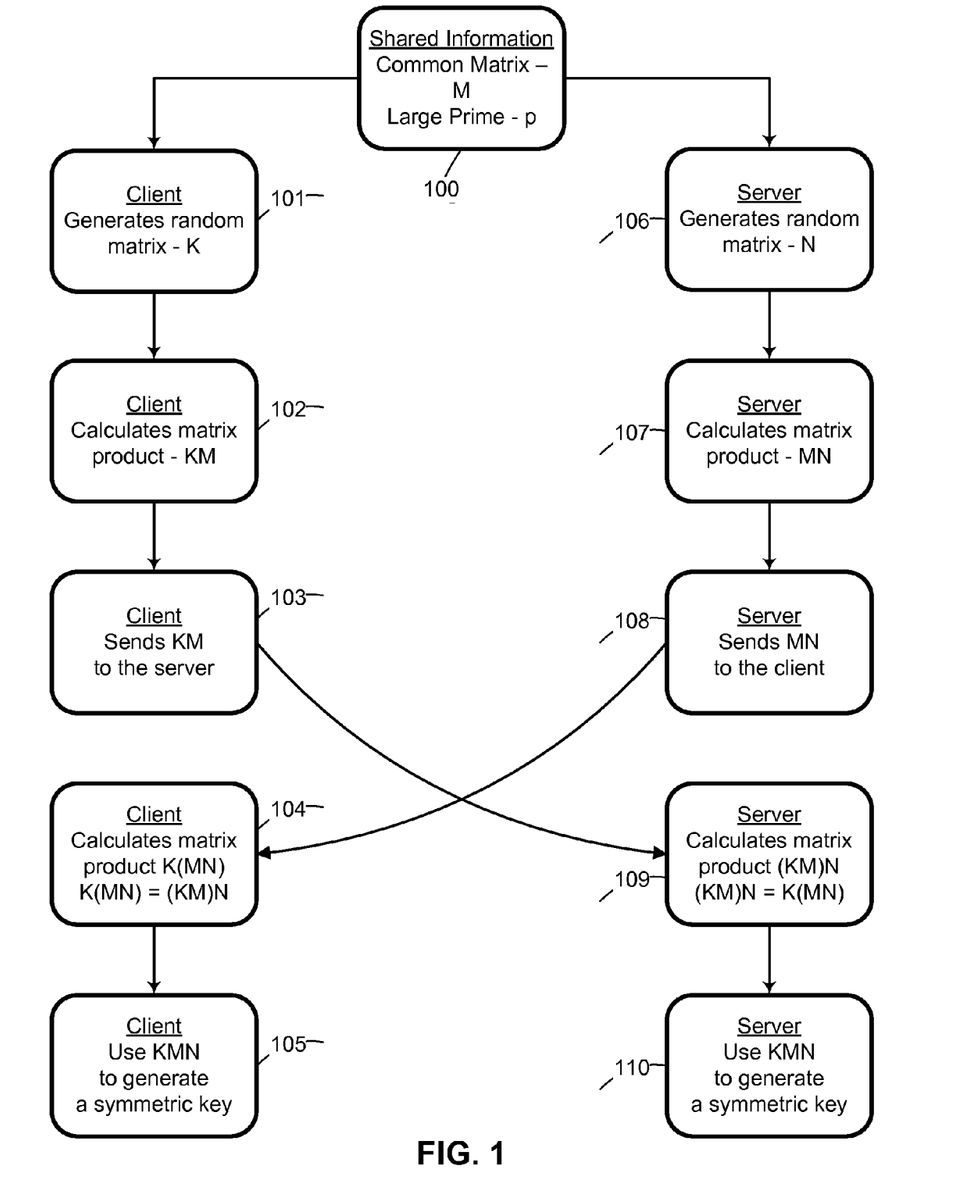
FIG. 1 is a flow chart illustrating one embodiment for establishing a secure key between two parties over an insecure communication channel.

Referencing FIG. 1, two parties select a common key by:
(100) The two parties agree upon a common matrix M and a large prime p to be used with the modulus function.

(101) The client randomly generates a matrix K.
(106) The server randomly generates a matrix N.
(102) The client left multiplies M with K.
(103) The client sends the product KM mod p to the server.
(107) The server right multiplies M with N.
(108) The server sends the product MN mod p to the client.
(104) The client left multiplies the received MN mod p value by K to create the product (K(MN mod p)) mod p.
(109) The server right multiplies the received KM mod p value by N to create product ((KM mod p)N) mod p.
(105) The client generates a symmetric key KEY from the (K(MN mod p)) mod p value.
(110) The server generates a symmetric key KEY from the ((KM mod p)N) mod p value.

FIG. 1 shows an embodiment in which the matrix multiplications KM, MN, (KM)N and K(MN) apply a mod p operation. As mentioned above, an alternative does not apply the mod p operation in the matrix multiplication.

The products (K(MN mod p)) mod p and ((KM mod p)N) mod p are equal because of the associative property, which is true for all matrix multiplication. The product KMN mod p can be used to produce a symmetric cryptographic key. All of the matrix multiplication steps in this embodiment use the modulus function with a large prime number p which is useful in further veiling the correct values of the matrices' elements by adding a period p.

Equivalently the sender (the client in the protocol's main embodiment) initiating the key exchange can perform right side multiplications and the receiver (the server in the protocol's main embodiment) can perform left side multiplications.

The protocol need not be started by the sender (the client in the protocol's main embodiment). It is clear that the receiver (the server in the protocol's main embodiment) could have also started the protocol after the initial request for communication that was generated by the sender.

The above algorithm works for any number of random matrices chosen on a given side. Thus K can be a single matrix, or itself a product of 2 to n matrices, just as N can be a single matrix, or itself a product of 2 to n matrices.

By scaling the size of the matrices the security of the key exchange can be made arbitrarily secure while still being fast. In addition, the range of numbers used as elements in the matrices can also be scaled to increase the security strength. The flip side of the argument is that if a given application requires speed and the reduced security is acceptable, then the size of the matrices can be scaled down. So, there are easily tunable parameters that are a tradeoff between speed and security; and even for the high security cases (large matrices) the performance is still quite fast when compared to exponentiation with large numbers.

The security of this method relies on using matrix multiplication as its one way function. A one way function is one that is easy to compute in one direction, and difficult, if not impossible, to compute in the other direction. For the current disclosure there are two different cases where matrix multiplication is used as a one way function: KM and MN. Given that M is known since it is a shared parameter and both products are sent over an insecure communication line, in the embodiment using the mod p operation in the matrix multiplication, an attacker has access to KM mod p, MN mod p, and M. Give those values he should not be able to easily calculate K or N.

Using the matrix product KMN a symmetric key can be generated on both sides. The symmetric key can be, for example, a byte string of selected length composed using well known processes, including the use of a hash of the matrix elements, a subset of the matrix elements, or all of the matrix elements in order or rearranged.

Key Exchange Security Conditions

For matrix multiplication there are cases where calculating K and N are easy. This means that there is a need to define the conditions that make calculating these values difficult if not impossible.

The common matrix M must be square and singular. Since its singular, there is no inverse of M. Matrix division is defined as multiplication of the inverse, so the KM and MN values cannot be divided by M to get the K and N values.

The geometries of K and N must also be considered. If M is a m×m matrix then K should be a k×m matrix where k<m. This is so that K will only have a right side pseudo-inverse, which cannot be used since the product KM can only be multiplied by a left side inverse of K. Similarly, if M is a m×m matrix, then N should be m×n matrix where n<m. This is so that N will only have a left side pseudo-inverse, which cannot be used since the product MN can only be multiplied by a right side inverse of N.

Additional consideration must be given to matrix M. Statistics often deals with random test data that is in the form of a singular matrix and has developed algorithms to process them into meaningful data. Some of these methods include the least squares solution, pseudo inverses, and various decompositions. These techniques typically give best fit approximations, or curves, as a solution to the data. It is important to note that these techniques are used on data that is supposed to be correlated in some manner.

Matrices K and N are generated randomly so that the elements of K are not related to one another, and the elements of N are not related to one another. The matrices K and N are not constrained by the requirement that they commute with any other matrix, or any other requirement concerning relationships among the elements of the matrices. Matrices K and N include random elements; and therefore, in incidences of use of the procedures described herein, matrix K does not commute with matrix N, and in other incidences the matrices K and N do not commute with any other matrix. Besides the requirement that matrices K and N are generated randomly, it is preferred that matrices K and N not be sparse matrices since there are additional statistical methods to analyze sparse matrices. A sparse matrix is a well known definition for someone skilled in the art. The definition of a sparse matrices, which is widely used and relevant to this invention, is that a sparse matrix is a matrix that has enough zeros in it that it pays to take advantage of them. This means that there must be a performance or memory advantage gained by exploiting the zeros for a matrix to be called sparse. This definition is dependant not only on the matrix, but also the algorithm used to analyze the matrix. So, the definition of sparse has less to do with the number of zeros, but how they may be exploited in some manner. It is clear that a concrete number, or percentage, of zeros needed to be sparse is not feasible to give in a vacuum without taking other factors into consideration. However, it would be clear to anyone skilled in the art if a given matrix would be considered sparse. If it was sparse, then the algorithms that exploit large numbers of zeros in a matrix would be used beneficially on the said matrix. A matrix would not be sparse if there were sufficient non-zero elements in the matrix for the algorithms to not be beneficial. In the scope of this invention, only non-sparse matrices will be considered. In the preferred embodiment all the elements of the matrices are non-zero.

This method is dealing with purely random data for matrices K and N where we don't want to have a best fit to the data for the matrix products KM and MN. Matrix M must be constructed so that there are no statistical methods can be used to help determine the K and N matrices. There are multiple ways to do this, but a preferred embodiment for this invention is to make all of the rows in the matrix M equal to each other. This has a direct, and beneficial for this invention, effect on the matrix rank. The row rank of a matrix is defined as the number of linearly independent rows in the matrix. The column rank of a matrix is defined as the number of linearly independent columns in the matrix. The rank of an entire matrix is defined as the minimum value of the row rank and the column rank. So, the condition where all the rows are the same will make the row rank equal to one, and thus, will also make the rank of the matrix equal to one; this condition also makes the matrix singular. In addition, the matrix M should not be sparse since there are many modified algorithms to help deal with sparse matrices; this is easily accomplished by requiring no zeros in the matrix.

The given preferred embodiment creates matrix M as a singular matrix of low rank by making all the rows the same. There are many other methods to generate matrix M as singular and low rank. For example, all the columns could be the same, the rows or columns could be scalar multiples of each other (row two is 5 times row one; column one is 3 times column two, etc.), the rows and columns could also be linear combinations of each other (adding rows together to generate other rows, or adding columns together to generate other columns).

While the preferred embodiment has the rank of M equal to one, it does not need to be one. The randomness of the client and server matrices multiplied by M, KM and MN respectively, are directly related to the rank of M. If M has a rank of one, then the entire matrices K and N are random since no statistical analysis methods recover any information about them when KM and MN are analyzed. The higher rank of matrix M, the more elements are leaked about the matrices K and N when KM and MN are analyzed. So, for a given matrix M of size m×m and a rank X, then number of rows or columns that are leaked is X−1. As an example, if M is 21×21 and its rank is 7, then 6 rows or columns of K and N will be recovered via statistical analysis when KM and MN are analyzed. The preferred embodiment, where the rank of M is 1, will need the smallest matrices to produce a given level of randomness. To further explain with an example, if M is of rank 5 and K is of size 17×21, then 4 of K's columns will be recovered. As such, the randomness only comes from, say, the first 14 columns. So, instead of all elements in the 17×21 matrix being random (if M's rank was 1), it'll only have 17×17 elements that are random. To achieve a given level of randomness it is clear that a M matrix of rank 1 will produce the smallest matrices. If M has a rank that is greater than one, then some of the rows or columns will be recovered and the randomness of K and N will be less than if M was of rank 1.

Looking further at the matrix product MN—with the specific preferred embodiment of conditions described in the preceding paragraphs—we see that since all the rows of M are the same that the product can be reduced to a 1×m M matrix multiplied by a m×n N matrix where n<m. The product MN will be a 1×n matrix. This is an underdetermined system where the number of linear equations is much less then the number of variables to solve for, which is impossible to solve for.

Looking further at the matrix product KM—with the specific preferred embodiment of conditions described in the preceding paragraphs—we see that for a given matrix M, the values in each column are the same, since all the rows of M are the same. For example, the first column of M could have a value of 5. By the definition of matrix multiplication, the left side matrix multiplies its rows by the right sides matrix's column. For the example, for the n variables in a given row of K, each would be multiplied by 5 and that would be an element in the KM matrix product that has a certain value, which can be labeled Y. The equation would look like: $5a+5b+5c+ \ldots +5n=Y$. The only source of randomness for the equation is the n variables from the given row in K. So, to analyze the randomness of a given K row multiplied by a given M column, we only need to look at the randomness of the given row K. The number of ways these n numbers can be added together is a permutation, with repetition, which is defined by the range of values of the variables to the power of the number of variables: range^variables. To take another example, a Java programming language integer that is non-negative can range from 0 to $2^{31}$. If there are 20 of these items, and the same number can be used more than once, then the permutation would be $(2^{31})^{20}$. This would be approximately equal to $4.3 \times 10^{186}$. To make the KM product secure, it needs to be more difficult to brute force than the final session symmetric key that is generated from the exchange. In other words, if the session symmetric key has less randomness then an attacker would simply attack the weakest point, which would be the session symmetric key, and not the matrix multiplication. As a frame of reference, the brute force space of a 32-byte symmetric key is $2^{256}$. This is approximately equal to $1.2 \times 10^{77}$. It can easily be seen that the order of randomness for a single 20 variable matrix row is far greater than the order of randomness for the 32-byte key. And this would only be for a single row of the matrix product; there would be others where the same permutation would apply. So, for a 20×20 matrix the single row brute force space would have to be applied 20 times. Additionally, each row returns many possible matches, not just one. So, a permutation of the possible matches would also have to be brute forced since the entire matrix must be correct. It is obvious that the order of magnitude for the matrix case is far greater than the order of magnitude for the 32-byte symmetric key case. The last operation that is added is the modulus function. Without the modulus operator algorithms and heuristics can be used to reduce, in some cases greatly, the brute force space. Once the modulus operator is used and the responses become cyclic over the period of the value p, the entire space must be iterated through to find the possible solutions.

The main advantage of this method and system is that it is much faster than methods that use exponentiation as their one way function. To do a brief and high level analyses of the performance difference between exponentiation using large numbers and matrix multiplication. When multiplying a n×n matrix by a n×n matrix there are $n^3$ operations. So, for example, a 20×20 matrix multiplied by a 20×20 matrix is $20^3$ which is equal to 8000. On a given side, the matrix protocol described herein does 2 of these multiplications per side. So, there are 2*8000 operations, which equal 16000. Using the expertise or RSA referenced in http://www.rsa.com/rsalabs/node.asp?id=2218, the smallest size that should be used for a key is a 768-bit modulus; this means that each exponent should be approximately 384 bits. This is $2^{384}$ and is approximately equal to $3.9 \times 10^{115}$, would be the number of multiplications to be performed (since this is the number in the exponent). While there are ways to optimize both operations, and since RSA keys are so widely used there are many methods to do so, they cannot close the massive gap in the base number of total operations. Performance for optimized algorithms differ based on the hardware used to perform the operations. However, given a 1024 bit asynchronous key and a 20×20 matrix, the number of matrix related multiplication operations will be lower than the number of multiplication operations in the exponentiation case by many orders of magnitude. With this order of magnitude difference in performance it is clear that the matrix multiplication is much faster.

Authenticated Key Exchange

This method and system of generating a session symmetric key is extended by using a shared secret to mutually authenticate both client and server to each other while not disclosing the shared secret to either online or offline attack.

Figure 2:
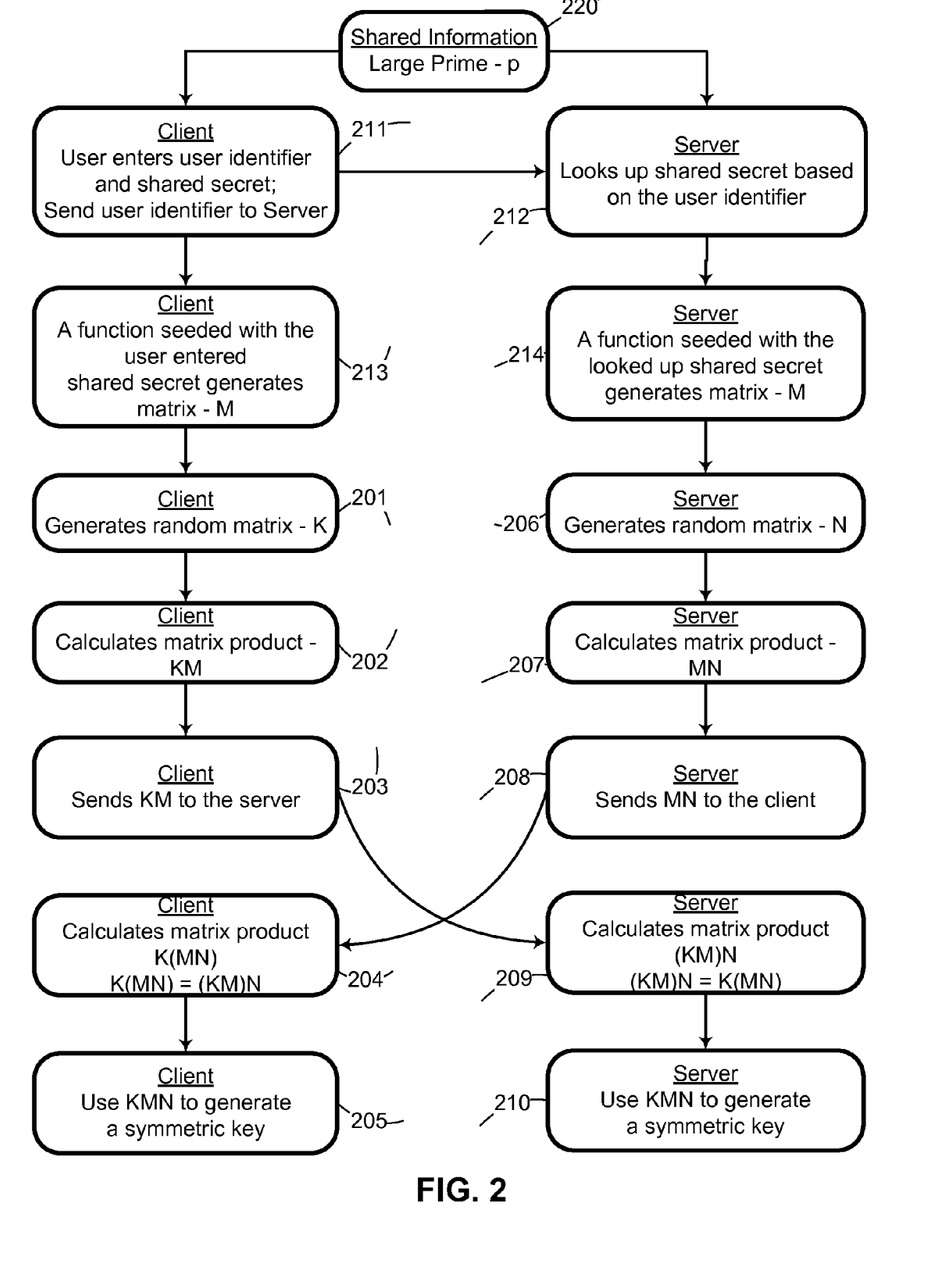
FIG. 2 is a flow chart illustrating one embodiment for establishing a mutually authenticated, secure key between two parties over an insecure communication channel.

Referencing the embodiment shown in FIG. 2, two parties select, and mutually authenticate, a common key by:

(200) The two parties agree upon a large prime p to be used with the modulus function.

(211) The client has the user enter their identifier and credential into the client and sends the user identifier to the server.

(213) The client generates matrix M from a function seeded with the shared secret.

(212) The server uses the user identifier to look up the shared secret from the credential store.

(214) The server creates matrix M from a function seeded with the looked up shared secret.

(201) The client randomly generates a matrix K.

(206) The server randomly generates a matrix N.

(202) The client left multiplies M with K.

(203) The client sends the product KM mod p to the server.

(207) The server right multiplies M with N.

(208) The server sends the product MN mod p to the client.

(204) The client left multiplies MN mod p by K to create the product (K(MN mod p)) mod p.

(209) The receiver right multiplies KM mod p with N to create product ((KM mod p)N) mod p.

(205) The client generates a symmetric key KEY from the (K(MN mod p)) mod p value.

(210) The server generates a symmetric key KEY from the ((KM mod p)N) mod p value.

FIG. 2 shows an embodiment in which the matrix multiplications KM, MN, (KM)N and K(MN) apply a mod p operation. As mentioned above, an alternative does not apply the mod p operation in the matrix multiplication.

If the matrix M on both sides was the same (the user entered credential was the same as the one in the credential store), then the KMN products will be the same on both sides. A standard algorithm for key validation can be used to validate the keys and, if the M matrix was the same on both sides, will succeed and the two parties will be mutually authenticated. If the user entered an incorrect credential, then the exchanged keys would be different, and the key validation would fail.

We take the method and system for secure key exchange and replace the shared matrix M with a matrix M generated by a function seeded with the shared secret. M is no longer a shared value; it is generated independently on both the client and server side. On the client side a user is requested to enter their identifier and their shared secret. The identifier must be sent to the server and then the server can look up the shared secret from a credential store. The client and server matrices, K and N, are still randomly populated. The M matrices are generated by functions seeded by the shared secrets. The client calculates the matrix product KM mod p and sends it to the server. The server calculates the matrix product MN mod p and sends it to the client. The only things that are known to an attacker are the products KM mod p and MN mod p that are sent over the communication channel. In the previous method an attacker knowing M, KM, and MN could not determine K and N. For this case, the attacker only knows KM and MN which makes determining K, M, and N even more difficult since there are less known values to work with.

The shared secret used to generate M on the server and client must be the same. However, this does not mean the shared secret has to be a static value like a password or a pin. It could be a dynamic credential like a one-time pin. It could also be a random session-only challenge pointing to a certain random session-only subset of a static credential. For instance, the credential could be either an alphanumeric password or a static pattern on a grid with random session-only digital content in the grid's cells, so that the response is becoming a random session-only code equal on the sender and receiver sides, provided they both know the challenge and the credential. Also, in a case of a textual password, a nonce could be sent and added to the static credential to randomize M per session. These values can be delivered to the user either in- or out-of-band; this means that both what-user-has and what-user-knows authentication works with the matrix-based key exchange protocol. Essentially, as long as both the client and server have the same value that is used to seed the function that generates matrix M, then the protocol will work.

Key Exchange Examples

Let's show an illustrative example of a key negotiation, which is merely an embodiment of the first method and system:

Let the client random matrix K be 17×23 and be filled with integers in the range of zero to $2^{31}$ (the java Integer size). Let the server random matrix N be 23×17 and filled with random integers in the range of zero to $2^{31}$. There is a common, shared matrix M that is 23×23 and the first row is filled with random numbers from zero to $2^{31}$. All the other rows in matrix M are the same as the first row. A large prime p is used for the modulus operator. The client calculates the matrix product KM mod p and the server calculates the product MN mod p. KM mod p is 17×23 and M does not have an inverse (it is singular) and K has only a right side inverse. MN mod p is 23×17 where M does not have an inverse (it is singular) and N only has a left side inverse. Since M is a poorly conditioned singular matrix of rank one (singular and all the rows are the same), typical statistical analysis methods do not work to recover either matrix K or matrix N. The client multiplies (K(MN mod p)) mod p, which is equivalent to (K(MN)) mod p since mod distributes over matrix multiplication. Similarly, the server multiplies ((KM mod p)N) mod p, which is equivalent to ((KM)N) mod p since mod distributes over matrix multiplication. The client and server will have the same matrix product KMN mod p because the associative property applies to all matrix multiplication. This value can then be used to generate a symmetric key.

To modify the above example for the second method and system where the two parties are mutually authenticated to each other:

Instead of being shared, the matrix M is generated by a function seeded with a credential. The user enters their identifier and shared secret and the client generates matrix M in addition to the random matrix K. In addition to KM mod p, the client would also send the user identifier to the server. The server would use the identifier to look up the credential from the credential store and use the same function seeded with the shared secret to generate matrix M in addition to the random matrix N. The server would send back the product MN mod p. From this point the protocol is the same. Each side completes the next multiplication step and then proceeds to a standard algorithm to validate the keys. If the matrix M on both sides was the same (the credential was the same), then the key validation will succeed and the two parties will be mutually authenticated. If the user entered the incorrect credential, then the negotiated keys would be different, and the key validation would fail.

Computer and Network Infrastructure and Configuration

Figure 3:
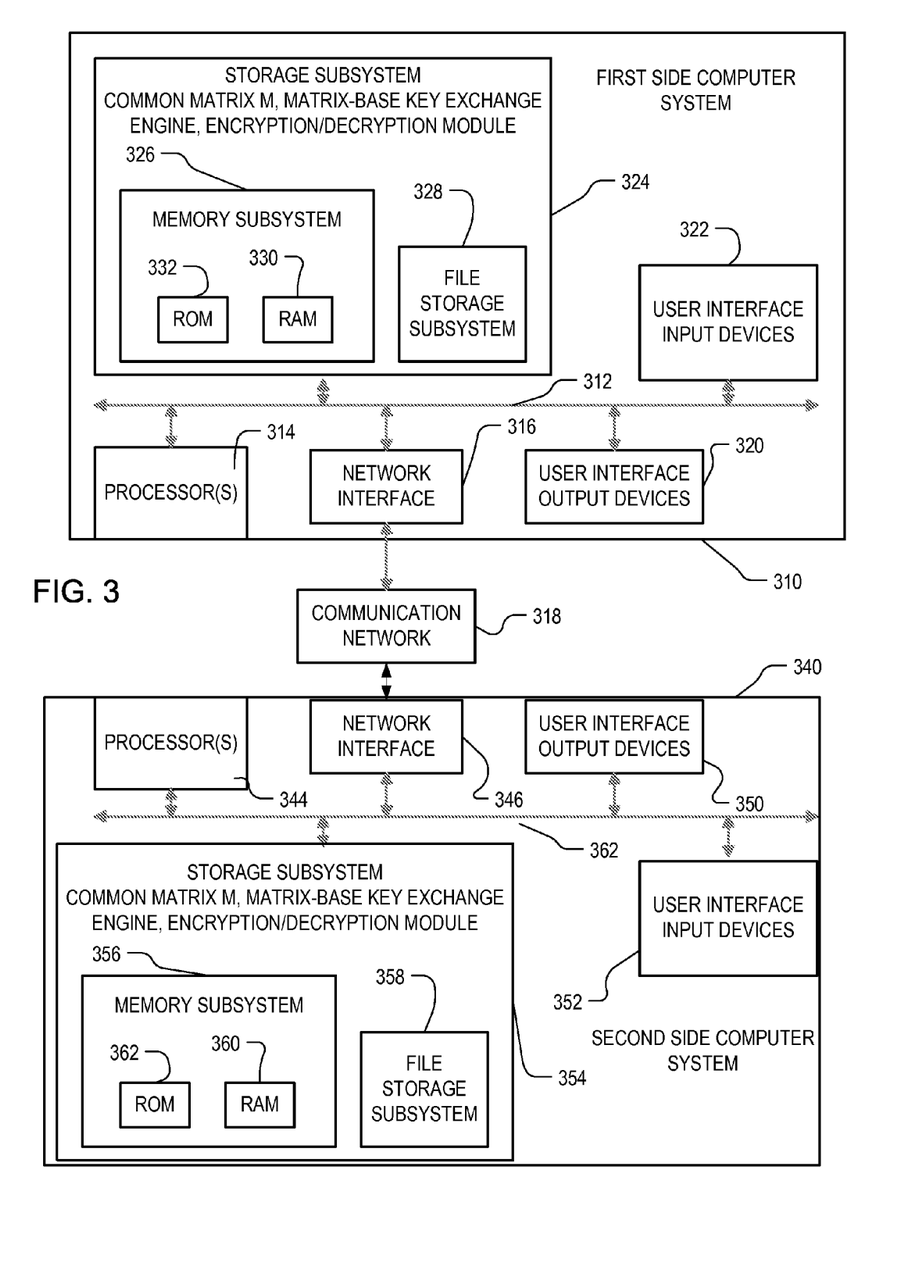
FIG. 3 is a block diagram representative of first and second computer systems implementing a matrix-multiplication based key exchange and encrypted communication systems, including the use a previously shared common matrix M.

FIG. 3 is a simplified block diagram of a first computer system 310 and a second computer system 340 coupled via a communication network 316 or channel, suitable for use with or as embodiments of key exchange and encrypted communications systems described herein. The first computer system 310 typically includes at least one processor 314 which communicates with a number of peripheral devices via bus subsystem 312. These peripheral devices may include a storage subsystem 324, comprising a memory subsystem 326 and a file storage subsystem 328, user interface input devices 322, user interface output devices 320, and a network interface subsystem 316. The input and output devices allow user interaction with computer system 310. Network interface subsystem 316 provides an interface to outside networks, including an interface to communication network 318, and is coupled via communication network 318 to corresponding interface devices in other computer systems. Communication network 318 may comprise many interconnected computer systems and communication links. These communication links may be wire line links, optical links, wireless links, or any other mechanisms for communication of information. While in one embodiment, communication network 318 is the Internet, in other embodiments, communication network 318 may be any suitable computer network. Likewise, the second computer system 340 typically includes at least one processor 344 which communicates with a number of peripheral devices via bus subsystem 362. These peripheral devices may include a storage subsystem 354, comprising a memory subsystem 356 and a file storage subsystem 358, user interface input devices 352, user interface output devices 350, and a network interface subsystem 346. The input and output devices allow user interaction with computer system 340. Network interface subsystem 346 provides an interface to outside networks, including an interface to communication network 318, and is coupled via communication network 318.

User interface input devices 322, 352 may include a keyboard, pointing devices such as a mouse, trackball, touchpad, or graphics tablet, a scanner, a touch-screen incorporated into the display, audio input devices such as voice recognition systems, microphones, and other types of input devices. In general, use of the term "input device" is intended to include all possible types of devices and ways to input information into computer systems 310, 340 or onto communication network 318.

User interface output devices 320, 350 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image, a video signal or an IPTV stream. The display subsystem may also provide non-visual display such as via audio output devices. In general, use of the term "output device" is intended to include all possible types of devices and ways to output information from computer systems 310, 340 to the user or to another machine or computer system.

Storage subsystem 324 stores the basic programming and data constructs that provide the functionality of some or all of the processes described herein, including the executable instructions. These software modules are generally executed by processor(s) 314. When the programming and data constructs are combined with other resources in the computer systems 310, 340, the computer systems include logic to perform the functions described above in connection with FIG. 1, on both the sending and receiving sides. For acting as the receiving party, the logic in addition to using a random number generator for creating the matrix N and optionally storing a shared modulus such as a large prime p, as described herein, is configured to:

store the common matrix M;

receive from a sending party a matrix product KM, which results from multiplication at the sending party of a random matrix K of size k×m and the matrix M;

multiply the matrix M by a random matrix N of size m×n, and transmit the matrix product MN to the sending party;

multiply the received matrix product KM by the matrix N to produce a common matrix product (KM)N, which is equal, because of the associative property, to the matrix product K(MN) which results from multiplication of the matrix K and the matrix product MN transmitted to the sending party;

use at least part of the common matrix product (KM)N to produce a cryptographic key;

receive a message from the sending party, at least part of which is encrypted using the cryptographic key; and decrypt the part of the message using the cryptographic key.

Optionally, the logic applies the mod p operation in the matrix multiplication steps.

For acting as the sending party, the logic in addition to using a random number generator for creating the matrix K and optionally storing a shared modulus such as a large prime p, as described herein, is configured to:

store the common matrix M;

multiply the matrix M by a random matrix K of size k×m, and transmit the matrix product KM to a receiving party;

receive from the receiving party a matrix product MN, which results from multiplication at the receiving party of a random matrix N of size m×n and the matrix M;

multiply the received matrix product MN by the matrix K to produce a common matrix product K(MN), which is equal, because of the associative property, to the matrix product (KM)N which results from multiplication of the matrix K and the matrix product MN transmitted to the sending party;

use at least part of the common matrix product K(MN) to produce a cryptographic key; and encrypt at least part of a message using the cryptographic key to produce an encrypted message, and send the encrypted message to the receiving party.

Optionally, the logic applies the mod p operation in the matrix multiplication steps.

Memory subsystems 326, 354 typically include a number of memories including a main random access memory (RAM) 330, 360 for storage of instructions and data during program execution and a read only memory (ROM) 332, 362 in which fixed instructions are stored. File storage subsystems 328, 358 provide persistent storage for program and data files, and may include a hard disk drive, a floppy disk drive along with associated removable media, a CD-ROM drive, an optical drive, or removable media cartridges. The databases and modules implementing the functionality of certain embodiments may be stored by file storage subsystems 328, 358.

Bus subsystems 312, 362 provide a mechanism for letting the various components and subsystems of computer systems 310, 340 communicate with each other as intended. Although bus subsystems 312, 362 are shown schematically as a single bus, alternative embodiments of the bus subsystem may use multiple busses.

Computer systems 310, 340 can be of varying types including a personal computer, a portable computer, a workstation, a computer terminal, a network computer, a smart phone, a television, a mainframe, or any other data processing system or user device. The computer systems 310, 340 will in many embodiments be different from one another, so that key exchange and encrypted communications can be performed between variant computer systems. Due to the ever-changing nature of computers and networks, the description of computer systems 310, 340 depicted in FIG. 3 is intended only as a specific example for purposes of illustrating the preferred embodiments. Many other configurations of computer systems 310, 340 are possible having more or less components than the computer system depicted in FIG. 3.

Figure 4:
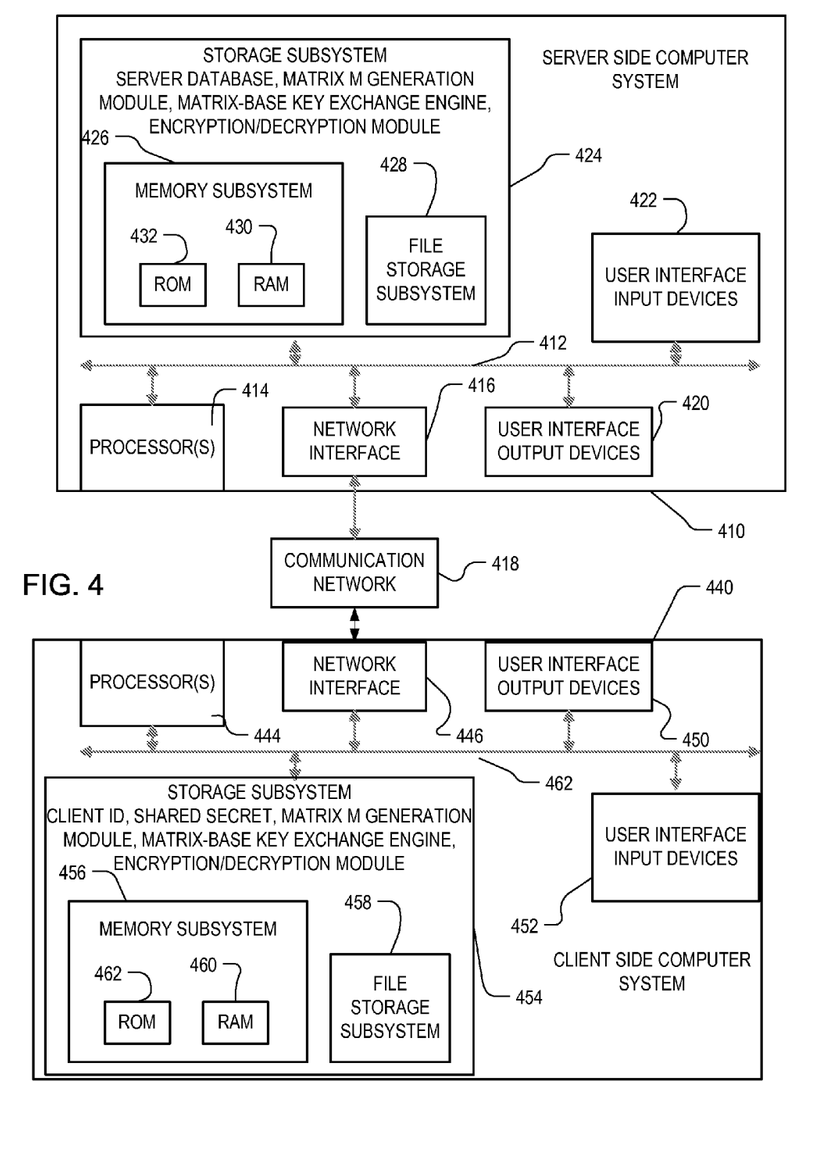
FIG. 4 is a block diagram representative of client and server computer systems implementing a matrix-multiplication based key exchange and encrypted communication systems, including authentication.

FIG. 4 is a simplified block diagram of a first computer system, such as a server side computer system 410 and a second computer system, such as a client side computer system 440, coupled via a communication network 416 or channel, suitable for use with or as embodiments of key exchange and encrypted communications systems described herein. The server side computer system 410 typically includes at least one processor 414 which communicates with a number of peripheral devices via bus subsystem 412. These peripheral devices may include a storage subsystem 424, comprising a memory subsystem 426 and a file storage subsystem 428, user interface input devices 422, user interface output devices 420, and a network interface subsystem 416. The input and output devices allow user interaction with computer system 410. Network interface subsystem 416 provides an interface to outside networks, including an interface to communication network 418, and is coupled via communication network 418 to corresponding interface devices in other computer systems. Communication network 418 may comprise many interconnected computer systems and communication links. These communication links may be wire line links, optical links, wireless links, or any other mechanisms for communication of information. While in one embodiment, communication network 418 is the Internet, in other embodiments, communication network 418 may be any suitable computer network. Likewise, the client side computer system 440 typically includes at least one processor 444 which communicates with a number of peripheral devices via bus subsystem 462. These peripheral devices may include a storage subsystem 454, comprising a memory subsystem 456 and a file storage subsystem 458, user interface input devices 452, user interface output devices 450, and a network interface subsystem 446. The input and output devices allow user interaction with computer system 440. Network interface subsystem 446 provides an interface to outside networks, including an interface to communication network 418, and is coupled via communication network 418.

User interface input devices 422, 452 may include a keyboard, pointing devices such as a mouse, trackball, touchpad, or graphics tablet, a scanner, a touch-screen incorporated into the display, audio input devices such as voice recognition systems, microphones, and other types of input devices. In general, use of the term "input device" is intended to include all possible types of devices and ways to input information into computer systems 410, 440 or onto communication network 418.

User interface output devices 420, 450 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image, a video signal or an IPTV stream. The display subsystem may also provide non-visual display such as via audio output devices. In general, use of the term "output device" is intended to include all possible types of devices and ways to output information from computer systems 410, 440 to the user or to another machine or computer system.

Storage subsystem 424 stores the basic programming and data constructs that provide the functionality of some or all of the processes described herein on a server side system, including the executable instructions. These software modules are generally executed by processor(s) 414. When the programming and data constructs are combined with other resources in the computer systems 410, the computer systems include logic to perform the functions described above in connection with FIG. 2, on the server side. For acting as the server side receiving party, in addition to storing a client database, or other memory construct to associate user identifiers for clients with shared secrets and optionally a shared modulus such as a large prime p, and to using a random number generator for creating the matrix N as described herein, the logic is configured to:

receive a user identifier from a sending party;

generate a singular matrix M of size m×m using a shared secret associated with the received user identifier;

receive from a sending party a matrix product KM, which results from multiplication at the sending party of a random matrix K of size k×m and the matrix M;

multiply the matrix M by a random matrix N of size m×n, and transmit the matrix product MN to the sending party;

multiply the received matrix product KM by the matrix N to produce a common matrix product (KM)N, which is equal, because of the associative property, to the matrix product K(MN) which results from multiplication of the matrix K and the matrix product MN transmitted to the sending party;

use at least part of the common matrix product (KM)N to produce a cryptographic key;

receive a message from the sending party, at least part of which is encrypted using the cryptographic key; and decrypt the part of the message using the cryptographic key.

Optionally, the logic applies the mod p operation in the matrix multiplication steps.

Storage subsystem 454 in client side computer system 440 stores the basic programming and data constructs that provide the functionality of some or all of the processes described herein on a client side system, including the executable instructions. These software modules are generally executed by processor(s) 444. When the programming and data constructs are combined with other resources in the computer systems 440, the computer systems include logic to perform the functions described above in connection with FIG. 2, on the client side. For acting as the client side sending party, in addition to storing a user identifier, a shared secret, and optionally a shared modulus such as a large prime p, and to using a random number generator for creating the matrix K as described herein, the logic is configured to:

send a user identifier to a receiving party, such as the server;

generate a singular matrix M of size m×m at the sending party using a shared secret known by the receiving party in association with the user identifier;

multiply the matrix M by a random matrix K of size k×m, and transmit the matrix product KM to a receiving party;

receive from the receiving party a matrix product MN, which results from multiplication at the receiving party of a random matrix N of size m×n and the matrix M;

multiply the received matrix product MN by the matrix K to produce a common matrix product K(MN), which is equal, because of the associative property, to the matrix product (KM)N which results from multiplication of the matrix K and the matrix product MN transmitted to the sending party;

use at least part of the common matrix product K(MN) to produce a cryptographic key; and encrypt at least part of a message using the cryptographic key to produce an encrypted message, and send the encrypted message to the receiving party.

Optionally, the logic applies the mod p operation in the matrix multiplication steps.

Memory subsystems 426, 454 typically include a number of memories including a main random access memory (RAM) 430, 460 for storage of instructions and data during program execution and a read only memory (ROM) 432, 462 in which fixed instructions are stored. File storage subsystems 428, 458 provide persistent storage for program and data files, and may include a hard disk drive, a floppy disk drive along with associated removable media, a CD-ROM drive, an optical drive, or removable media cartridges. The databases and modules implementing the functionality of certain embodiments may be stored by file storage subsystems 428, 458. Bus subsystems 412, 462 provide a mechanism for letting the various components and subsystems of computer systems 410, 440 communicate with each other as intended. Although bus subsystems 412, 462 are shown schematically as a single bus, alternative embodiments of the bus subsystem may use multiple busses.

Computer systems 410, 440 can be of varying types including a personal computer, a portable computer, a workstation, a computer terminal, a network computer, a smart phone, a television, a mainframe, or any other data processing system or user device. The computer systems 410, 440 will in many embodiments be different from one another, so that key exchange and encrypted communications can be performed between variant computer systems. Due to the ever-changing nature of computers and networks, the description of computer systems 410, 440 depicted in FIG. 4 is intended only as a specific example for purposes of illustrating the preferred embodiments. Many other configurations of computer systems 410, 440 are possible having more or less components than the computer system depicted in FIG. 4.

Figure 5:
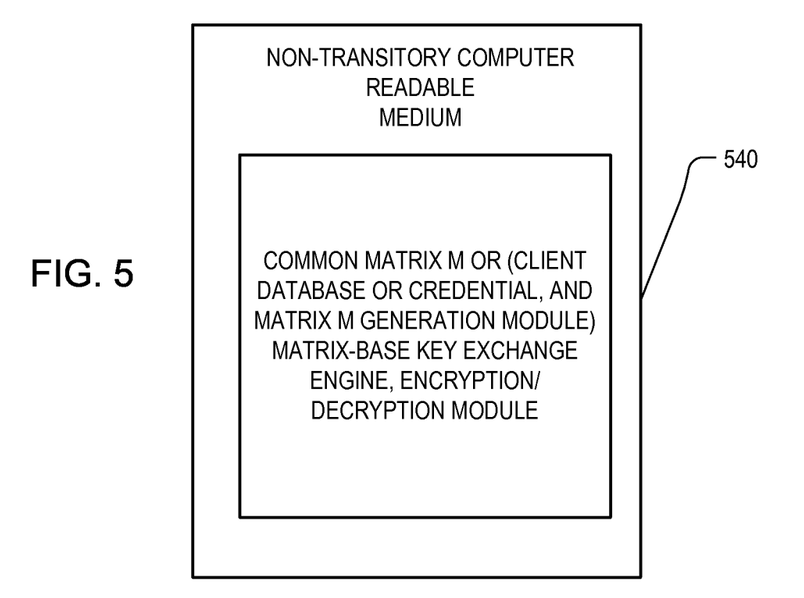
FIG. 5 illustrates an article of manufacture comprising a computer readable medium storing programs and data for matrix-multiplication based key exchange and encrypted communication systems.

FIG. 5 shows a non-transitory computer readable medium 540, which can be a medium associated with or part of file storage subsystems (328, 354, 428 or 454) and/or with network interface subsystems (316, 346, 416 or 446). The computer readable medium can be a hard disk, a floppy disk, a CD-ROM, an optical medium, non-volatile or volatile integrated circuit memory such as flash memory or DRAM, or removable media cartridge. The computer readable medium 540 can be part of a computer system. Also, it can be a removable or portable medium delivered to the profiling user by mail. The technology described herein can be embodied as computer instructions and data constructs that are executable and usable by computer systems, such that when combined with computer systems, and executed, the computer instructions stored on the computer readable medium comprise logic to perform the processes described herein, including storing common matrix M and/or storing a client database or client credential along with a matrix M generation module, and optionally storing the shared modulus p for a mod p operation applied the matrix multiplication steps, executing a matrix-based key exchange engine with random number generator for creating the matrices K and/or N as described herein, and executing an encryption/decryption module for encrypted communications.

ADVANTAGES OVER THE PRIOR ART

The advantage this method has over traditional methods that use exponentiation as their one way function, like RSA and Diffie-Hellman, is that there is a large performance improvement by using matrix multiplication as the one way function. Furthermore, this invention's matrix generation is done purely by using a random number generator. This is much faster than trying to finding RSA key pairs. The boundary conditions of the system are also quite simple: besides the matrix geometries, the matrix M can have all its rows the same and that is all. In contrast, other matrix based key exchanges, like Slavin and Rubin, require that at least two of their matrices have to commute for their art to work. When two matrices have to commute, there are additional conditions that must be placed on the generation of those matrices since matrix multiplication is not normally commutative. Since the random matrices explained in this invention truly are random, with no limitations on their generation, unlike matrices that must commute, it is easier to generate the matrices for this method and system than for other prior art using matrix multiplication as its one way function.

With the emergence of cloud computing and software as a service, the need for scalable, secure, and fast, key exchange is more necessary than ever. And in a world where mobile phone use is skyrocketing and that platform is processor power constrained, the exchange must also perform well to be accepted by users. There are many instances where a key exchange like this could be used. A clear case for its use would be any place that the Diffie-Hellman and variants thereof, including authenticated Diffie-Hellman variants, could be used. These scenarios could include client-server communication, machine-to-machine communication, peer-to-peer communications, all of which could exist in a standalone model, or with a trusted third party server that establishes trust and distributes session specific M matrices to peer parties who then can perform this matrix exchange, and other types of similar communications.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method for enabling a first party, which can be a sending or receiving party, and a second party, which can be a receiving or sending party, to develop at least one cryptographic key as the basis for secure communication of at least part of a message Y, using computerized devices for storing, processing, transmitting and receiving data, comprising: selecting a singular matrix M of size m×m; the first party choosing a random matrix K; the first party left multiplying said matrix M by said matrix K and transmitting the matrix product KM to the second party; the second party choosing a random matrix N; the second party right multiplying said matrix M by said matrix N and transmitting the matrix product MN to the first party; the first party left multiplying the received matrix product MN by the matrix K to produce the matrix product K(MN); and the second party right multiplying the received matrix product KM by the matrix N to produce the matrix product (KM)N, which is equal to the matrix product K(MN) because of the associative property of matrix multiplication; wherein: the first and second parties have thereby both developed the matrix product K(MN)=(KM)N; and at least part of said matrix product K(MN)=(KM)N being usable to produce at least one cryptographic key which can be used for encrypting and decrypting at least part of said message Y.

2. The method of claim 1, further comprising: the first party using said cryptographic key to encrypt at least part of said message Y; the first party transmitting said encrypted message to the second party; and the second party using said cryptographic key to decrypt at least part of said message Y.

3. The method of claim 1, further comprising using the matrix product K(MN)=(KM)N to produce one cryptographic key.

4. The method of claim 1, further comprising using the matrix product K(MN)=(KM)N to produce a plurality of cryptographic keys.

5. The method of claim 4, further comprising producing at least one of said cryptographic keys using only part of said matrix product K(MN)=(KM)N.

6. The method of claim 1, wherein the singular matrix M has rank of 1.

7. The method of claim 1, wherein the singular matrix M is not a sparse matrix.

8. The method of claim 1, wherein the random matrix K has size k×m or m×k, and the random matrix N has size n×m or m×n, and k<m and n<m.

9. The method of claim 1, including applying a modulo operation in said multiplying steps.

10. A system for enabling a first party, which can be a sending or receiving party, and a second party, which can be a receiving or sending party, to develop at least one common cryptographic key as the basis for secure communication of at least part of a message Y, comprising first party and second party computerized devices with associated data storage, processing, transmitting and receiving capacity, configured for: selecting a singular matrix M of size m×m; the first party choosing a random matrix K; the first party left multiplying said matrix M by said matrix K and transmitting the matrix product KM to the second party; the second party choosing a random matrix N; the second party right multiplying said matrix M by said matrix N and transmitting the matrix product MN to the first party; the first party left multiplying the received matrix product MN by the matrix K to produce the matrix product K(MN); and the second party right multiplying the received matrix product KM by the matrix N to produce the matrix product (KM)N, which is equal to the matrix product K(MN) because of the associative property of matrix multiplication; wherein: the first and second parties have thereby both developed the matrix product K(MN)=(KM)N; and the at least part of said matrix product K(MN)=(KM)N being usable to produce at least one cryptographic key which can be used for encrypting and decrypting at least part of said message Y.

11. The system of claim 10, further comprising: the first party using said cryptographic key to encrypt at least part of said message Y; the first party transmitting said encrypted message to the second party; and the second party using said cryptographic key to decrypt at least part of said message Y.

12. The system of claim 10, further comprising said computerized devices configured for using the matrix product K(MN)=(KM)N to produce one cryptographic key.

13. The system of claim 10, further comprising said computerized devices configured for using the matrix product K(MN)=(KM)N to produce more than one cryptographic key.

14. The system of claim 10, further comprising said computerized devices configured for producing at least one of said cryptographic keys using only part of said matrix product K(MN)=(KM)N.

15. The system of claim 10, wherein the singular matrix M has rank of 1.

16. The system of claim 10, wherein the singular matrix M is not a sparse matrix.

17. The system of claim 10, wherein the random matrix K has size k×m or m×k, and the random matrix N has size n×m or m×n, and k<m and n<m.

18. The system of claim 10, including said computerized devices including logic for applying a modulo operation in said multiplying steps.

19. A method for developing at least one cryptographic key as the basis for secure communication of at least part of a message, using computerized devices for storing, processing, transmitting and receiving data, comprising:

storing a singular matrix M of size m×m;

receiving from a sending party a matrix product KM, which results from a multiplication in a predetermined order selected from left side multiplication and right side multiplication of the singular matrix M by a random matrix K of size k×m or m×k;

multiplying the singular matrix M by a random matrix N of size m×n or n×m to produce a matrix product MN using an opposite order selected from left side multiplication and right side multiplication, and transmitting the matrix product MN to the sending party;

multiplying using said opposite order the received matrix product KM by the matrix N to produce a matrix product (KM)N, which is equal, because of the associative property, to the matrix product K(MN) which results from multiplication in the first predetermined order of the matrix product MN by the matrix K;

using at least part of the matrix product (KM)N to produce a cryptographic key;

receiving a message from the sending party, at least part of which is encrypted using the cryptographic key; and decrypting the part of the message using the cryptographic key.

20. The method of claim 19, wherein the singular matrix M has rank of 1.

21. The method of claim 19, wherein the singular matrix M is not a sparse matrix.

22. The method of claim 19, wherein k<m and n<m.

23. The method of claim 19, including using a random number generator to produce elements of the matrix N.

24. The method of claim 19, including applying a modulo operation in said multiplying steps.

25. A method for developing at least one, mutually authenticated, common cryptographic key as the basis for secure communication of at least part of a message, using computerized devices for storing, processing, transmitting and receiving data, comprising:

storing a singular matrix M of size m×m;

multiplying the singular matrix M by a random matrix K of size k×m or m×k using a predetermined order selected from left side multiplication and right side multiplication, and transmitting the matrix product KM to a receiving party;

receiving from the receiving party a matrix product MN, which results from multiplication in an opposite order selected from left side multiplication and right side multiplication of the singular matrix M by a random matrix N of size m×n or n×m;

multiplying using the predetermined order the received matrix product MN by the matrix K to produce a matrix product K(MN), which is equal, because of the associative property, to the matrix product (KM)N which results from multiplication in said opposite order of the matrix product (KM) by the matrix N;

using at least part of the matrix product K(MN) to produce a cryptographic key; and encrypting at least part of a message using the cryptographic key to produce an encrypted message, and sending the encrypted message to the receiving party.

26. The method of claim 25, wherein the singular matrix M has rank of 1.

27. The method of claim 25, wherein the singular matrix M is not a sparse matrix.

28. The method of claim 25, wherein k<m and n<m.

29. The method of claim 25, including using a random number generator to produce elements of the matrix K.

30. The method of claim 25, including applying a modulo operation in said multiplying steps.

31. An apparatus for developing at least one, mutually authenticated, common cryptographic key as the basis for secure communication of at least part of a message, comprising:
a processor arranged to execute logic processes, and including memory, a singular matrix M of size m×m stored in the memory, a communications port, and instructions stored in the memory executable by the processor, the logic processes including logic to
receive from a sending party a matrix product KM, which results a multiplication in a predetermined order selected from left side multiplication and right side multiplication of the singular matrix M by a random matrix K of size k×m or m×k;
multiply the singular matrix M by a random matrix N of size m×n or n×m to produce a matrix product MN using an opposite order selected from left side multiplication and right side multiplication, and transmit the matrix product MN to the sending party;
multiply using said opposite order the received matrix product KM by the matrix N to produce a matrix product (KM)N, which is equal, because of the associative property, to the matrix product K(MN) which results from multiplication in the first predetermined order of the matrix product MN by the matrix K;
use at least part of matrix product (KM)N to produce a cryptographic key;
receive a message from the sending party, at least part of which is encrypted using the cryptographic key; and
decrypt the part of the message using the cryptographic key.

32. The apparatus of claim 31, wherein the singular matrix M has rank of 1.

33. The apparatus of claim 31, wherein the singular matrix M is not a sparse matrix.

34. The apparatus of claim 31, wherein k<m and n<m.

35. The apparatus of claim 31, including a random number generator to produce elements of the matrix N.

36. The apparatus of claim 31, the logic processes including logic to apply a modulo operation in said logic to multiply the singular matrix M by a random matrix N, and in said logic multiply the received matrix product KM by the matrix N.

37. An apparatus for developing at least one, mutually authenticated, common cryptographic key as the basis for secure communication of at least part of a message, comprising:
a processor arranged to execute logic processes, and including memory, a singular matrix M of size m×m stored in the memory, a communications port, and instructions stored in the memory executable by the processor, the logic processes including logic to
multiply the singular matrix M by a random matrix K of size k×m or m×k using a predetermined order selected from left side multiplication and right side, and transmit the matrix product KM to a receiving party;
receive from the receiving party a matrix product MN, which results from multiplication in an opposite order selected from left side multiplication and right side multiplication of the singular matrix M by a random matrix N of size m×n or n×m;
multiply using the predetermined order the received matrix product MN by the matrix K to produce a product K(MN), which is equal, because of the associative property, to the matrix product (KM)N which results from multiplication in said opposite order of the matrix product KM by the matrix N;
use at least part of the matrix product K(MN) to produce a cryptographic key; and
encrypt at least part of a message using the cryptographic key to produce an encrypted message, and send the encrypted message to the receiving party.

38. The apparatus of claim 37, wherein the singular matrix M has rank of 1.

39. The apparatus of claim 37, wherein the singular matrix M is not a sparse matrix.

40. The apparatus of claim 37, wherein k<m and n<m.

41. The apparatus of claim 37, including a random number generator to produce elements of the matrix K.

42. The apparatus of claim 37, the logic processes including logic to apply a modulo operation in said logic to multiply the singular matrix M by a random matrix K, and in said logic multiply the received matrix product MN by the singular matrix K.

43. A non-transitory computer readable memory storing executable instructions, the executable instructions defining logic using a singular matrix M for developing at least one, mutually authenticated, common cryptographic key as the basis for secure communication of at least part of a message, and comprising logic to:
receive from a sending party a matrix product KM, which results from a multiplication in a predetermined order selected from left side multiplication and right side multiplication of the singular matrix M by a random matrix K of size k×m or m×k;
multiply the singular matrix M by a random matrix N of size m×n or n×m to produce a matrix product MN using an opposite order selected from left side multiplication and right side multiplication, and transmit the matrix product MN to the sending party;
multiply using said opposite order the received matrix product KM by the matrix N to produce a matrix product (KM)N, which is equal, because of the associative property, to the matrix product K(MN) which results from multiplication in the first predetermined order of the matrix product MN by the matrix K;
use at least part of the matrix product (KM)N to produce a cryptographic key;
receive a message from the sending party, at least part of which is encrypted using the cryptographic key; and
decrypt the part of the message using the cryptographic key.

44. The computer readable memory of claim 43, wherein the singular matrix M has rank of 1.

45. The computer readable memory of claim 43, wherein the singular matrix M is not a sparse matrix.

46. The computer readable memory of claim 43, wherein k<m and n<m.

47. The computer readable memory of claim 43, the logic including a random number generator to produce elements of the matrix N.

48. The computer readable memory of claim 43, said executable instructions including logic to apply a modulo operation in said logic to multiply the singular matrix M by a random matrix N, and in said logic multiply the received matrix product KM by the singular matrix N.

49. A non-transitory computer readable memory storing executable instructions, the executable instructions defining logic using a singular matrix M for developing at least one, mutually authenticated, common cryptographic key as the basis for secure communication of at least part of a message, and comprising logic to:

multiply the singular matrix M by a random matrix K of size k×m or m×k using a predetermined order selected from left side multiplication and right side, and transmit the matrix product KM to a receiving party;

receive from the receiving party a matrix product MN, which results from multiplication in an opposite order selected from left side multiplication and right side multiplication of the singular matrix M by a random matrix N of size m×n or n×m;

multiply using the predetermined order the received matrix product MN by the matrix K to produce a product K(MN), which is equal, because of the associative property, to the matrix product (KM)N which results from multiplication in said opposite order of the matrix product (KM) by the matrix N;

use at least part of the product K(MN) to produce a cryptographic key; and encrypt at least part of a message using the cryptographic key to produce an encrypted message, and send the encrypted message to the receiving party.

50. The computer readable memory of claim 49, wherein the singular matrix M has rank of 1.

51. The computer readable memory of claim 49, wherein the singular matrix M is not a sparse matrix.

52. The computer readable memory of claim 49, wherein k<m and n<m.

53. The computer readable memory of claim 49, the logic including a random number generator to produce elements of the matrix K.

54. The computer readable memory of claim 49, said executable instructions including logic to apply a modulo operation in said logic to multiply the singular matrix M by a random matrix K, and in said logic multiply the received matrix product MN by the matrix K.

* * * * *